United States Patent
Combs et al.

(10) Patent No.: US 10,202,733 B2
(45) Date of Patent: Feb. 12, 2019

(54) METHOD OF USING LOW-DENSITY, FREEZABLE FLUID TO CREATE A FLOW BARRIER IN A WELL

(71) Applicant: CSI Technologies LLC, Houston, TX (US)

(72) Inventors: Nathan Kyle Combs, Spring, TX (US); Jeffrey Thomas Watters, Spring, TX (US); David Duane Brown, Cypress, TX (US); Larry Thomas Watters, Spring, TX (US)

(73) Assignee: CSI Technologies LLC, Houston, TX (US)

( * ) Notice: Subject to any disclaimer, the term of this patent is extended or adjusted under 35 U.S.C. 154(b) by 0 days.

(21) Appl. No.: 15/668,513

(22) Filed: Aug. 3, 2017

(65) Prior Publication Data

US 2018/0038061 A1 Feb. 8, 2018

Related U.S. Application Data

(60) Provisional application No. 62/494,323, filed on Aug. 5, 2016.

(51) Int. Cl.
| | | |
|---|---|---|
| *E21B 33/068* | (2006.01) | |
| *E02D 19/16* | (2006.01) | |
| *C09K 8/66* | (2006.01) | |
| *E21B 33/035* | (2006.01) | |
| *C09K 8/42* | (2006.01) | |
| *C09K 8/44* | (2006.01) | |
| *C09K 8/512* | (2006.01) | |
| *E21B 29/00* | (2006.01) | |
| *E21B 33/03* | (2006.01) | |
| *E21B 36/00* | (2006.01) | |

(52) U.S. Cl.
CPC .............. *E02D 19/16* (2013.01); *C09K 8/426* (2013.01); *C09K 8/44* (2013.01); *C09K 8/512* (2013.01); *C09K 8/66* (2013.01); *E21B 29/00* (2013.01); *E21B 33/03* (2013.01); *E21B 33/035* (2013.01); *E21B 36/001* (2013.01)

(58) Field of Classification Search
None
See application file for complete search history.

(56) References Cited

U.S. PATENT DOCUMENTS

| | | | |
|---|---|---|---|
| 4,817,719 A * | 4/1989 | Jennings, Jr. .......... | C09K 8/424 166/292 |
| 5,649,594 A * | 7/1997 | Flak ....................... | E21B 33/00 166/277 |
| 6,979,366 B2 | 12/2005 | Chatterji et al. | |
| 8,703,659 B2 | 4/2014 | Dalrymple et al. | |
| 2004/0211557 A1 | 10/2004 | Cole et al. | |

(Continued)

OTHER PUBLICATIONS

PCT International Search Report and Written Opinion dated Dec. 18, 2017, for International Application No. PCT/US2017/45423.

*Primary Examiner* — Andrew Sue-Ako
(74) *Attorney, Agent, or Firm* — Patterson + Sheridan, LLP

(57) ABSTRACT

Disclosed herein is a temporary wellbore sealant, comprising water, a gelling agent; and a filler, wherein: the filler has a lower specific gravity than the water of the sealant; and the sealant has a lower specific heat than the water of the sealant and a method of temporarily sealing a liquid filled wellbore therewith.

11 Claims, 6 Drawing Sheets

(56) References Cited

U.S. PATENT DOCUMENTS

| | | | |
|---|---|---|---|
| 2005/0082066 A1* | 4/2005 | McGuire | E21B 33/038 166/379 |
| 2008/0302542 A1* | 12/2008 | Pessin | E21B 33/068 166/386 |
| 2009/0149354 A1* | 6/2009 | Dajani | C09K 8/12 507/230 |
| 2014/0048265 A1* | 2/2014 | Combs | C09K 8/426 166/292 |
| 2014/0299812 A1 | 10/2014 | Ozdoruk | |

* cited by examiner

METHOD OF USING LOW-DENSITY, FREEZABLE FLUID TO CREATE A FLOW BARRIER IN A WELL

CROSS-REFERENCE TO RELATED APPLICATIONS

This application claims benefit of U.S. provisional patent application Ser. No. 62/494,323, filed Aug. 5, 2016, which is herein incorporated by reference.

BACKGROUND

Field

The embodiments hereof relate to the field of producing hydrocarbons from sub-surface formations through a tubular. More particularly, the embodiments hereof relate to the field of servicing a hydrocarbon producing well, where the wellhead must be removed but fluids under pressure remain in the production tubular connected to the wellhead.

Description of the Related Art

The wellhead installed on a petroleum well forms a flow barrier preventing hydrocarbons and other fluids within the well from escaping from the top of the well, i.e., escaping from the casing, an annulus comprising casings, or production tubing at the ultimate upper opening of the well. It is not uncommon for wellheads to become inoperable. For example, wellhead seals fail, the mechanical systems of the wellhead stop functioning, corrosion degrades the integrity of the materials making up the wellhead, and damage can occur to the wellhead from external forces. In each case, if severe enough, these issues will necessitate wellhead replacement. In some cases, the wellhead could be leaking, thus requiring replacement thereof in order to prevent exposure of the well fluids to the environment.

Normal wellhead replacement procedures start with killing of the well and installing barrier plugs which provide pressure and flow barriers in the well casing, production tubing, or both, at a location inwardly of the well from the wellhead so the wellhead can be removed without exposing workers or the environment to wellbore fluids possibly in a hot and pressurized state. However, in some instances, the condition of the wellhead is degraded to the point where normal operation of the wellhead to allow plugs to pass therethrough to seal the casing or production tubing is too severely compromised to allow access to the well therethrough to perform these well control operations. When these conditions are encountered, one method of creating a flow and pressure barrier in the well is to freeze the well fluid in the casing to form a solid plug in the well composed of frozen well fluids just below the wellhead. Once the frozen plug barrier is in place, the wellhead can be removed and replaced. After installation or repair of the wellhead, the plug is allowed to thaw and normal well operation can be resumed.

For wells having a wellhead on dry land, the process of freezing a well involves removing the earth around the wellbore to expose a portion of the wells' outermost casing extending from below the wellhead into the earth. For offshore wells with risers extending above the seafloor, and for wellheads located on a production platform, the casing below the wellhead is already exposed and accessible. For each of these well temporary plugging operations using well fluid freezing, i.e., temperature lowering of the well fluids to the pint of solidification thereof, to form the plug, a heat exchanger, typically having a stainless steel inner surface, is placed around the outermost casing of the well and liquid nitrogen or other suitable cooling fluid is pumped into, and if required, circulated through, the heat exchanger. The liquid nitrogen, which has a boiling point temperature of −321° F., is the most aggressive coolant used for this operation. The coolant flowing through the heat exchanger draws heat from the hotter casing and well fluid and thus cools the outer wall of the outermost casing string, and by continuing heat transfer of heat out of the casing and the adjacent well liquids, cools and eventually freezes, i.e., converts from the liquid to a solid state, the wellbore fluids in the casings and the production tubing therein. This creates a solid plug composed of a portion of the well fluid encircled by the heat exchanger, which prevents well fluids and well gases from flowing therethrough, allowing work on, or replacement of, the wellhead, to be performed without leakage of the well fluids during the work.

In some applications, the fluids in the wellbore are water based and thus freeze at temperatures attainable using the cooling technique described above. Most of these aqueous well fluids contain water having dissolved salts therein which depress the freezing point thereof to below that of fresh water. However, in many wells the wellbore fluid is hydrocarbon based which can be difficult or impossible to change into a solid state by cooling using liquid nitrogen. Even if the hydrocarbon-based fluid is solidified, the resulting plug is usually very weak and does not provide an adequate barrier to pressure or flow of well fluids from below, to above, the plug.

In order to successfully form a solid plug composed of solidified, by temperature reduction thereof and heat transfer therefrom, well fluid in a well, a static column of freezable fluid is needed. Typically, in order to obtain adequate solidification of a hydrocarbon-based fluid well, the fluid must be removed and replaced, or displaced with, a water-based fluid that freezes at a higher temperature than the solidification temperature of the hydrocarbons present in the well. Replacement of an entire column of hydrocarbon-based fluid can be very difficult, costly, and in some cases, impossible. Hydrocarbon-based fluids tend to have a lower density (around 7 lb/gal) than water, which prevents displacement thereof with a easily frozen liquid such as water due to density hierarchy, i.e., as the water is pumped into the well, the lighter hydrocarbons will displace to the top of the column of water. Attempts have been made to displace the hydrocarbon based fluids with fresh water (8.33 lb/gal) and try to quickly freeze the column of water in place. While this has had some very limited success, rapid swapping of the hydrocarbon and water fluids usually transpires, and either a solid plug is not formed because a water-well fluids composite is formed during cooling as a result of the density hierarchy of the fluids, or a very poor quality solid plug is formed.

Because of these density and solidification temperature issues, forming solid plugs in wells filled with hydrocarbon-based fluid by cooling to solidify the fluids in the well is not attempted even though there is a desire to do so.

The majority of wells requiring a barrier installed using the in suit freeze or solidification method prior to wellhead remediation are filled with aqueous brine fluids rather than hydrocarbons. Freezing a high-salt-concentration aqueous brine solution requires more heat transfer from the brine than does that required to freeze fresh water, since salts dissolved in the water depress the freezing point of the water. The magnitude of freezing point depression is directly related to salt ion concentration. Thus, heavier brines freeze at lower temperatures and take longer to transition from liquid to solid.

SUMMARY

Disclosed herein are a temporary wellbore sealant, specifically a freeze medium comprising water, a gelling agent; and a filler, wherein: the filler has a lower specific gravity than the water of the sealant; and the sealant has a lower specific heat than the water of the sealant, and a method of temporarily sealing a liquid filled wellbore therewith.

Herein, in an embodiment, a method of forming a plug in a well in situ comprises mixing together a freeze medium, comprising fresh water and a hollow agent, at location adjacent to the well in which the plug is to be formed, injecting the resulting fluid freeze medium into the well while displacing the liquid hydrocarbons in the well, attaching a cooling jacket to the outermost well casing, circulating coolant through the heat exchanger to cool and solidify the freeze medium, and pressure testing the resulting solidified freeze medium based plug to confirm the integrity of the so formed plug. This method results in inherent positive placement and location of the freeze medium, and predictable solidification of the freeze medium to create a barrier plug having reliably predictable properties and requiring less heat removal to convert into a solid plug. This method is also useful for creating freeze barrier plugs in brine filled wells. The same fluid used as the freeze medium in hydrocarbon-filled wells is also beneficial for forming temporary sealing plugs in brine-filled wells. The cohesive freeze medium in fluid form displaces and floats above the brine in the well ensuring the plug location and a freeze medium which is not significantly altered by the incorporation of brine therein. The freeze medium formulated with fresh water will solidify (freeze) at a higher temperature than the freezing point of the brine. Because the heat capacity of the freeze medium is significantly less than that of brine or fresh water, a lower quantity of heat removal therefrom is required to solidify the freeze medium.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
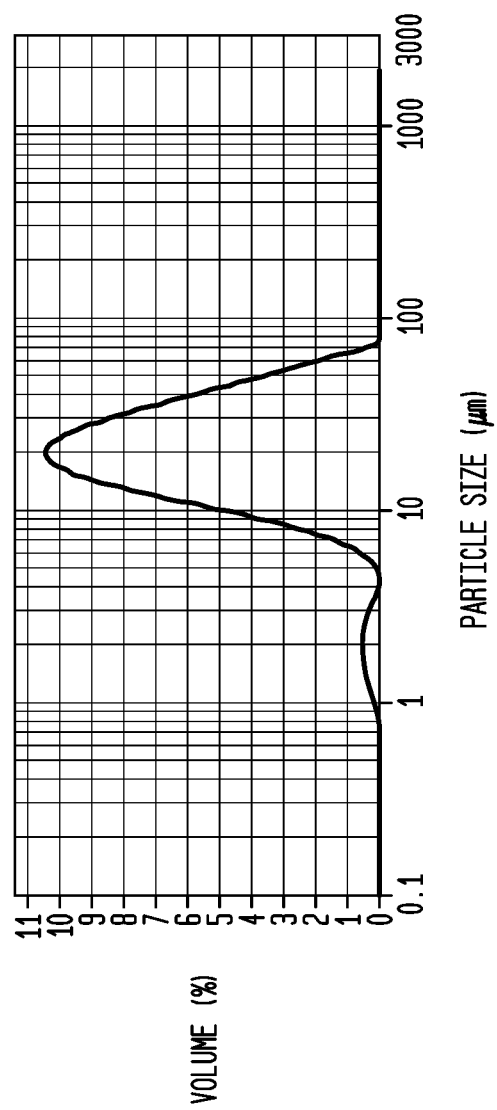
FIG. 1 is a distribution chart showing the distribution of the physical size of a specific grade of microspheres.

Herein, a freeze medium composite having a lower specific gravity than in situ well fluids present at the to be plugged location of a well are placed into the well in a fluid state and are there converted to a solid. Applicants herein have developed a low-density, water-based, freeze medium that is lighter (has a lower specific gravity) than the hydrocarbon fluid or brine in the well and is therefore able to displace these fluids in the well in situ and thereby be present at a desired location at the top of the well tubular(s) to form a solid plug, and which is easily solidified using the heat exchanger-coolant technique described above, to form a solid plug in situ in a well. This lighter freeze medium when introduced into the well stays at, or migrates to, the top of the column of fluid in the well at a location just below the wellhead. Thus the freeze medium is inherently located above the in situ hydrocarbon or brine fluid normally in this location in the well. Because it is lighter than the fluid in the well, the freeze medium will remain above, and displace, the fluid originally in the section of the well to be frozen. The freeze medium is then solidified (frozen) when the liquid nitrogen heat exchanger is placed around the well casing and liquid nitrogen is circulated therethrough, to form the solid barrier plug. From the time the freeze medium is solidified and the wellhead is removed, and until the wellhead is replaced, the liquid nitrogen flow through the heat exchanger is maintained to prevent the plug from achieving an elevated temperature and returning to the fluid state. After the work related to the wellhead has been performed, and a wellhead is in place on the well casing, the freeze medium is allowed to thaw and is flowed from the well using the inherent well pressure, and it is then discarded. The freeze medium hereof comprises a liquid-solids composite comprised of low density particulates, water, gelling agents, and additional chemicals used to adjust pH, inhibit bacterial growth, surfactants, etc. but which have little or no impact on the freezability of the freeze medium. Herein, a freeze medium is provided which has a density ranging from 5.3 to 8.0 lb/gal, although greater or lighter densities can be formulated and used as freeze medium materials.

The freeze medium hereof is composed of small diameter micro-spheres suspended in gelled water, wherein, in one embodiment, borosilicate hollow glass spheres comprise the particulate. To form the gelled water, guar as a gelling agent is combined with water to convert the water into the gelled water. The micro-spheres, being hollow and enclosing a pocket of air or other gas at pressures ranging from near atmospheric to vacuum, are thin walled, small in diameter, and inherently lighter than either the wellbore liquids or water. By mixing the microspheres, guar and water, a suspension is formed within which the micro-spheres are interspersed and suspended in the gelled water, and which can be pumped using standard oilfield equipment such that it can be introduced into a wellbore through the wellhead. Additionally, the freeze medium suspension which, by the use of the micro-spheres as described herein, is likewise lighter (lower in density) than the well liquids, and thus, this composite when introduced into the well through the wellhead will inherently displace well liquids to a location below the composite suspension, and will thus settle at a location in the well immediately below the wellhead. In addition to the contribution of buoyancy to the suspension composite, a sufficient portion of the incorporated microspheres are also capable of maintaining their physical integrity when exposed to the pressure and temperature conditions present at the plug location where the solid plug is formed from the freeze medium. Applicants herein have successfully used hollow borosilicate glass spheres having a D50 micron particle size of around 40 micron to form a freeze mediums which can be rapidly frozen within the wellbore to form a solid sealing plug of high integrity to allow repair or replacement of the wellhead, and which are readily thawed to allow removal thereof from the well.

Table 1 below sets forth illustrative materials for forming a gelled water/micro-sphere composite, wherein borosilicate hollow glass micro-spheres are used as the micro-spheres.

TABLE 1

Component Trade Names

| Material | Manufacturer | Product Name | Concentration Range (per 1000 gallons of water) |
|---|---|---|---|
| Hollow glass spheres | 3M | HGS3000 | 146-2446 lbs. |
| Hollow glass spheres | 3M | HGS4K28 | 146-2446 lbs. |
| Liquid Guar Concentrate (4 lb guar/gal) | Economy Polymer | Ecopol 2000LMS | 10-100 gal |
| Low pH Buffer | Economy Polymer | Ecopol Buffer L | 0.5-6 gal |

Hollow Glass Spheres

Two different borosilicate hollow glass spheres are described and used herein to prepare a suspension composite freeze medium. The first is 3M HGS3000 which has a specific gravity of 0.32, a D50 micron diameter of 40 microns, and a crush rating of 3000 psi in liquid. The second is 3M HGS4K28 which has a specific gravity of 0.28, a similar diameter as the HGS3000 microspheres, and a crush rating of 4000 psi in liquid. The 3M HGS4K28 hollow glass spheres mixed with liquid guar and water as described herein form a much lower density, more easily mixed, and higher strength suspension composite freeze medium than one formed using the 3M HGS3000 micro-spheres. However, any micro-sphere incorporable into water to form an suspension lighter than the well fluids extant in the well at the wellhead can be used to fabricate the freeze medium. Table 2 below lists a range of hollow glass sphere material grades, their physical and mechanical properties (maximum application pressure with less than 20 vol % failure of the microspheres physical integrity) and minimum density with which the freeze medium can be formulated at maximum working pressure of the well.

One of the key design considerations for a suspension composite freeze fluid using microspheres is the tradeoff of the crush strength of the micro-spheres versus their specific gravity. The pressures in the wellbore at the wellhead can, in some cases, exceed several thousand p.s.i. Two primary variables affecting the specific gravity of the microspheres are the outer diameter of the microspheres and the wall thickness thereof, assuming minimal change in the composition of the hollow spherical member structure of the hollow microsphere. Different hollow glass microsphere grades with different wall thicknesses are commercially available, and those with thicker walls are designed to withstand higher-pressure environments than those with thinner walls, but the specific gravity of the microspheres increases with their increasing wall thickness. The microsphere for a specific freeze plug application is selected to allow incorporation thereof into the suspension composite at a sufficient concentration ensure to that the resulting freeze fluid material is buoyant in the wellbore liquids of the well to be temporarily plugged, and also maintain that buoyancy when injected into the well, which occurs if a sufficient percentage or quantity of the microspheres do not fail by being crushed under the wellbore pressure conditions. Because microspheres in a batch of microspheres of a given specified grade or size will have an inherent range of diameters and wall thicknesses, and thus a variance in the pressure at which they will be crushed or will collapse, and formulations of the freeze fluid are configured taking this variance into account to ensure that less than 20% of the microspheres in the suspension composite fail by being crushed under the pressure conditions of the well. This requires that 25% more microspheres than required to assure buoyancy of the freeze medium in the well fluids is required in the mix design or recipe for the freeze medium based on the mean or average crush strength of the microspheres. This pressure-density paradigm is incorporated into the freeze medium composition design process to ensure proper density, stability, and pumpability of the resulting suspension. Table 2 illustrates the crush strength and specific gravity of different borosilicate hollow glass microspheres which can be incorporated into the freeze medium, and the volume percent of these hollow microspheres in the suspension composite required to make the suspension buoyant in a specific well fluid, herein a suspension having a median density 0.5 lb/gal. less than the well fluid density. Well pressures at the wellhead are typically 500 psi to 15,000 psi. The value of the percent volume needed for 8 lb/gal freeze fluid assumes that only 80% of the hollow microspheres remain intact after mixing of the suspension composite and injection thereof into the well.

TABLE 2

Hollow Glass Sphere Types and Associated Freeze Fluid Density Ranges

| 3M Hollow Glass Sphere Grade | Crush Strength psi | Minimum Fractional Survival at Crush Strength % | Hollow Glass Sphere Specific Gravity | Min Freeze Fluid Density lb/gal (Vol %) | Percent Volume Needed for 8 lb/gal Freeze Fluid % | Max Freeze Fluid Density at Crush Strength* lb/gal |
|---|---|---|---|---|---|---|
| HGS4K28 | 4,000 | 80 | 0.28 | 5.3 (50.7%) | 5.3% | 5.6 |
| HGS5000 | 5,500 | 80 | 0.38 | 5.8 (49.3%) | 6.8% | 6.1 |
| HGS6000 | 6,000 | 80 | 0.46 | 6.1 (49.9%) | 7.8% | 6.3 |

TABLE 2-continued

Hollow Glass Sphere Types and Associated Freeze Fluid Density Ranges

| 3M Hollow Glass Sphere Grade | Crush Strength psi | Minimum Fractional Survival at Crush Strength % | Hollow Glass Sphere Specific Gravity | Min Freeze Fluid Density lb/gal (Vol %) | Percent Volume Needed for 8 lb/gal Freeze Fluid % | Max Freeze Fluid Density at Crush Strength* lb/gal |
|---|---|---|---|---|---|---|
| HGS8000X | 8,000 | 90 | 0.42 | 5.9 (50.6%) | 7.2% | 6.0 |
| HGS19K46 | 19,000 | 80 | 0.46 | 6.1 (49.9%) | 7.8% | 6.3 |

Herein, in determining the Max Freeze fluid density at crush strength, the fractional survival percentage of the hollow microspheres is used to calculate the change in volume of intact hollow glass spheres before and after exposure of the freeze fluid to the well pressure and the resulting fluid density To determine the particle size distribution of as purchased HGS4K28 hollow glass spheres, a MASTERSIZER 2000 was used. The information from that testing is shown in FIG. 1. However, as the particle size distribution ("PSD") of a specified grade of 3M hollow glass spheres advertised are similar, the PSD of FIG. 1 be taken as representative of grade of hollow glass spheres.

Mixing

Herein, fluid polymers are used to gel water to a desired viscosity, and the polymer is allowed to hydrate a predetermined period of time necessary to fully gel the water. The gelled water, known as a linear gel, is then adjusted to a desired pH using a buffer, and the microspheres are added and paddle mixed to be uniformly intermixed therein. Because the borosilicate glass micro-spheres contain boron which will react with the polymer gelling agent, the linear gel cross links once the borosilicate glass beads are added thereto. The end result is a very viscous fluid with a three dimensional structure capable of suspending the microspheres therein as mixed, as injected into the well, and under well conditions, and holding the microspheres in suspension so that a relatively uniform distribution thereof is provided in the freeze medium in both the fluid and solid states. Thus, by using microspheres composed of borosilicate glass, or microspheres having a boron coating thereon, the resulting freeze medium is a buoyant, cross linked, suspension composite freeze medium which does not require additional boron to initiate and drive the cross linking reaction. Thus the microspheres meet a dual need, they add buoyancy to the freeze fluid and also cause the cross linking reaction which substantially locks them in place within the resulting highly viscous fluid. Another sequence in which the ingredients are combined includes starting by mixing the water with the borosilicate glass microbeads to evenly distribute the microbeads in the water, and optionally other chemicals such as biocides, surfactants, defoamers, together until a homogenous mixture is formed. The gelling polymer is then added, followed immediately by the lowering of pH of the mixture to around 7 by adding the low pH buffer. This causes the hydration of the polymer caused by lowering of the pH, and cross-linking of the polymer by reaction with the boron in the glass beads, to happen simultaneously, substantially locking the hollow glass spheres inside the three dimensional structure of the gelled formulation by the relatively high viscosity thereof.

Working Examples

A freeze medium hereof was formulated and tested in both a lab environment as a full size working model configured to simulate the placement and solidification of the freeze medium hereof in an actual wellbore. Finally, the freeze medium hereof was used to temporarily plug a wellbore for wellhead removal and replacement in the field.

Figure 2:
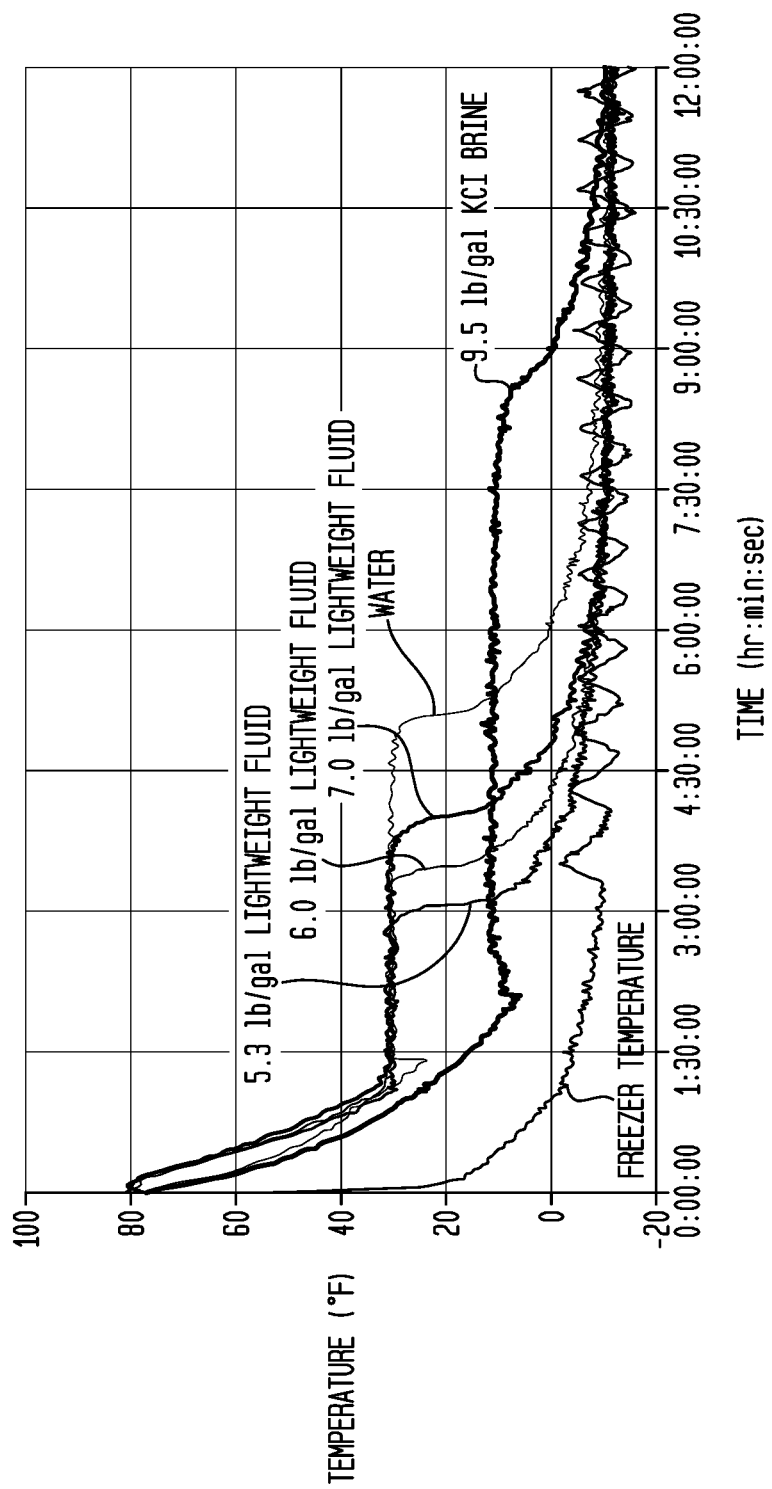
FIG. 2 is a graph showing the relationship between time and temperature for a plurality of freeze fluids and water exposed to the same solidification temperature ambient.

Lab Environment Example:

In the lab environment, a solidification profile and thermal property comparisons of 5 freeze media compositions was undertaken. The five freeze media tested are listed below:
 1. Fresh water
 2. 9.5 lb/gal KCL Brine
 3. 5.3 lb/gal Lightweight Fluid using 3M HGS4K28 Hollow Glass Spheres
 4. 6.0 lb/gal Lightweight Fluid using 3M HGS4K28 Hollow Glass Spheres
 5. 7.0 lb/gal Lightweight Fluid using 3M HGS4K28 Hollow Glass Spheres FIG. 2 shows the results of the solidification profile testing of the above described freeze media and fresh water. The figure clearly shows that there is no increase in the time required to solidify the freeze media including the microspheres, nor any lowering of the solidification temperature thereof as compared to that for fresh water. In fact, there is a major reduction in the amount of time required for the freeze medium to solidify; up to 2 hours less time than for fresh water to solidify in the case of the 5.3 lb/gal density freeze medium. Additionally, since most wells contain hydrocarbons or some sort of brine based fluid, the results shown in FIG. 2 demonstrate that the time required to create a barrier plug using the freeze media hereof is drastically less than that required to freeze hydrocarbon liquids or brine in the well. Essentially, the chart shows that the time required to freeze the material in the to be plugged location of the well is dependent on the mass of water in the system, and is not meaningfully effected by the hollow glass spheres other than their use reducing the quantity of water per linear or cubic foot or cm of freeze medium needing to be frozen. Not only does the buoyant freeze medium solidify sufficiently to form a sealing plug in the well, it solidifies faster than the same volume of fresh water or brine or any other fluid that would likely be in a wellbore, using less energy to achieve a solid plug in the well. This results in reduced operational time to form the plug by freezing, thus aiding in lowering operational cost.

The thermal properties of the 5 freeze media of Table 3 were evaluated to compare their performance and determine the effect of incorporation of particulates, specifically the borosilicate glass microspheres, on the thermal conductivity and specific heat thereof. To perform this testing, freeze media as formulated in Table 3 were mixed and then transferred to a freezer for 24 hours. The samples were then tested inside the freezer to obtain values of the properties of the freeze media where the freeze media temperature was at approximately −12° F. Table 3 includes the resulting thermal properties. The results show that the lighter weight fluids which include the particulates, here the microspheres, therein have a significantly lower specific heat than either fresh water or brine. This allows for these lighter weight media to solidify faster as compared to just fresh water or brine under the same cooling conditions as used to freeze (solidify) the fresh water or the brine, and thus solidify more efficiently. The lower specific heat of the lighter weight media confirms that less energy is required to solidify them as compared to just fresh water or brine. The most likely reason for this behavior is the reduced mass of water per unit volume of freeze medium due to the presence of significant volumes of hollow glass microspheres having a much lower specific heat than the water into which they are incorporated. The thermal conductivity of the lighter weight freeze media is also lower than the only fresh water or brine freeze fluids. This lowered thermal conductivity did not prove detrimental to the freezing profiles of the freeze media in the small scale evaluation hereof. This lower thermal conductivity and resulting lower heat transfer rate will reduce the overall coefficient of heat transfer of the freeze media, but for the wellbore and annulus diameters encountered in application of the freeze medium, this effect is negligible.

The freeze medium hereof is a cohesive fluid, and thus intermixing thereof with in situ well fluids during injection into the well is minimized. However, when applied to wells containing aqueous brine, a concentration gradient of solute ions will exist between the brine and the fresh water-based freeze medium. This gradient drives diffusion of brine solute ions into the fresh water of the freeze medium. The rate of diffusion is proportional to the magnitude of the solute concentration gradient. So the initial diffusion rate is the maximum rate, and the diffusion rate decelerates rapidly as solute ions moving into the freeze medium lower the concentration gradient between the freeze medium and the brine. The process of ionic diffusion is both time dependent and concentration dependent. Given enough time, ionic diffusion into a cohesive, salt-free freeze medium placed above high concentration brine would equalize the salt ion concentration between the two fluids. Practically, concentration gradient factors slow diffusion sufficiently so that the freeze medium solidifies prior to attaining a diffused salt concentration approaching that of the brine in the well.

The freezing temperature of aqueous brine is lower than the freezing point of fresh water. This lowered freezing point is directly proportional to the concentration of salt ions in the solution. The proportional relationship is expressed mathematically as:

$$\Delta T = iK\_fm$$

where
$\Delta T$=Change in freezing point temperature
I=van't Hoff factor of the salt
Kf=molal freezing point depression constant
m=molality of the solute.

High concentration brines, such as 9.7 lb/gal potassium chloride or 12.7 lb/gal sodium bromide, are frequently used as well fluids for increasing hydrostatic pressure in the well to aid in well control. These brines freeze (solidify) at temperatures of 5.4° F. and −27.5° F., respectively. Even considering an increase in salinity in a freeze medium resulting from ionic diffusion thereinto, limits on the diffusion rates ensures that a lower salt concentration is present in the freeze medium compared to the brine at time of solidification of the freeze medium. Therefore, the freeze medium will freeze at a higher temperature than the brine, and requires a lower magnitude of heat transfer therefrom, and thus less energy is expended to cool as a result of lower cumulative heat transfer into the liquid nitrogen circulating in the cooling jacket from the casing, tubing and wellbore fluids, to achieve and maintain a solid state for a freeze medium incorporating the hollow spheres.

TABLE 3

Thermal Property Testing (Approximately −12° F.)

| Sample | Thermal Conductivity W/mK | Specific Heat MJ/m³K |
|---|---|---|
| Water | 2.475 | 1.781 |
| 9.5 lb/gal KCl Brine | 2.768 | 2.267 |
| 5.3 lb/gal Lightweight Fluid | 0.014 | 0.006 |
| 6.0 lb/gal Lightweight Fluid | 0.976 | 0.981 |
| 7.0 lb/gal Lightweight Fluid | 1.627 | 1.278 |

Additionally, Applicants performed solidification of a freeze media in a large scale (production sized) tubular in a lab setting to ensure that the freeze media hereof will solidify into a solid barrier capable of holding pressure as required in a field application. Table 4 shows the composition of the fluid media that was used for the evaluation. The fluid media solidified and had an overall density of 6.2 lb/gal and incorporated HGS3000 hollow glass spheres in the formulation thereof.

TABLE 4

Fluid composition for large scale lab test mix (6.2 lb/gal)

| Material | Concentration |
|---|---|
| Water/guar | — |
| HGS3000 | 2.11 lb/(gal of water) |
| Ecopol 2000LMS | 63.96 gal/(1000 gal of water) |
| Ecopol Buffer L | 0.75 gal/(1000 gal of water) |

Figure 3:
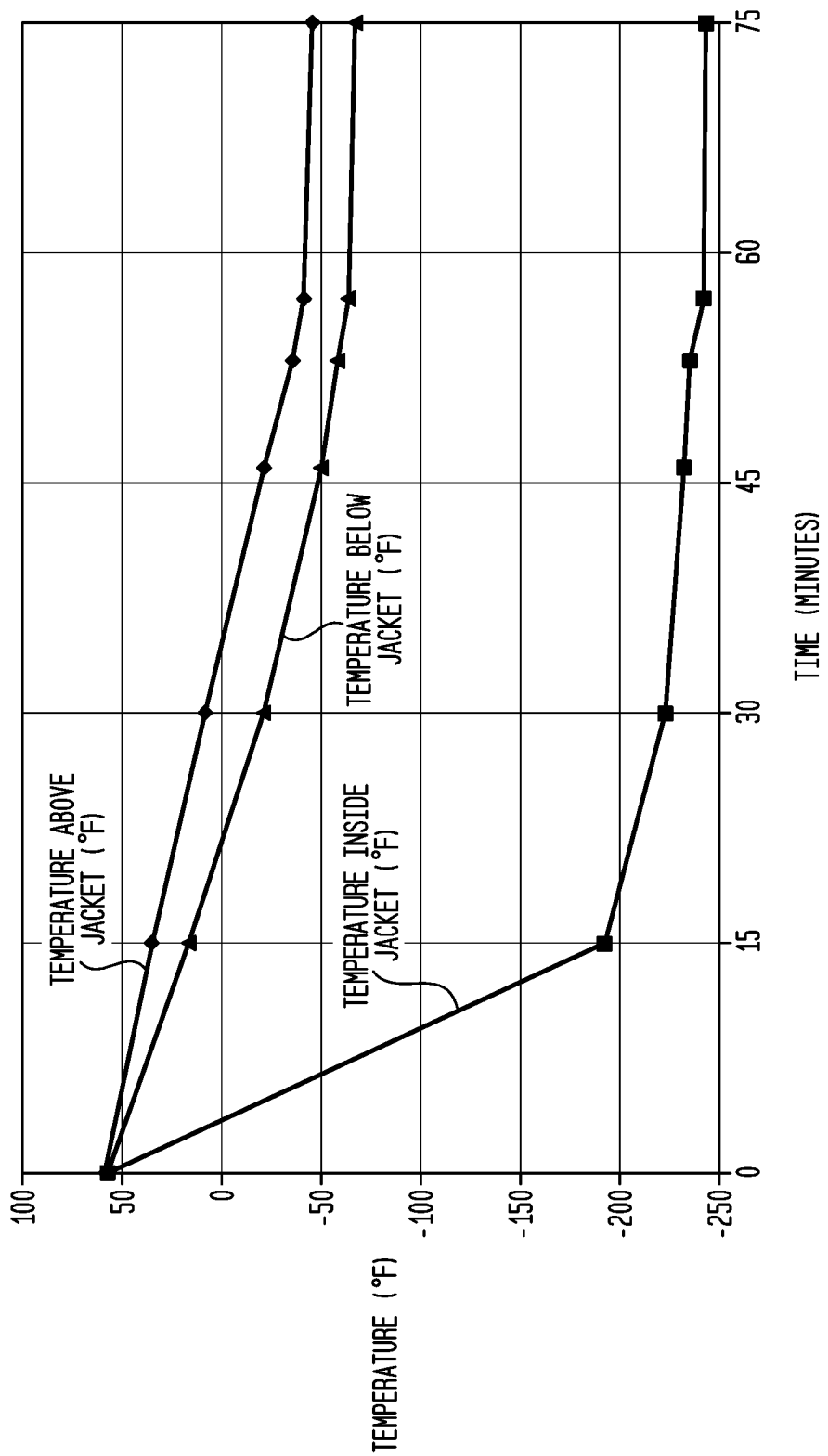
FIG. 3 is a graph showing the freeze profile of the freeze fluids and water exposed to the same solidification temperature ambient of FIG. 3.

The test was done in an 8 ft. tall, 2⅞ in diameter piece of upright, i.e., vertically oriented, oilfield tubing with a liquid nitrogen heat exchanger around a one foot section thereof located about 5 ft. from the bottom of the section of tubing. The tubing was filled with diesel fuel (about 6.8 lb/gal) to simulate a hydrocarbon filled tubular up to a location about 18 inches below the heat exchanger. The tubing was then loaded with the freeze media of the composition of Table 4 having a density of 6.3 lb/gal design to approximately 2 ft. above the heat exchanger. The fluid was allowed to sit static for a moment to allow any potential fluid swapping to occur. It was visually determined that no fluid swapping was occurring between the diesel fuel and the freeze medium. Liquid nitrogen was then circulated through the heat exchanger, and solidification of the freeze medium was observed. The resulting solidification profile of the freeze medium is shown in FIG. 3. The temperature of the freeze medium solidified and reached −40° F. in approximately 50 minutes, based on measurement using a thermo-couple strapped to outer pipe just above the point where cooling jacket of the heat exchanger ended. At this point the freeze medium, as a solid plug, was deemed ready to pressure test. In FIG. 3, the temperatures are based on thermocouples strapped to the outer surface of the pipe above, below and generally at the center of the cooling jacket of the heat exchanger.

Figure 4:
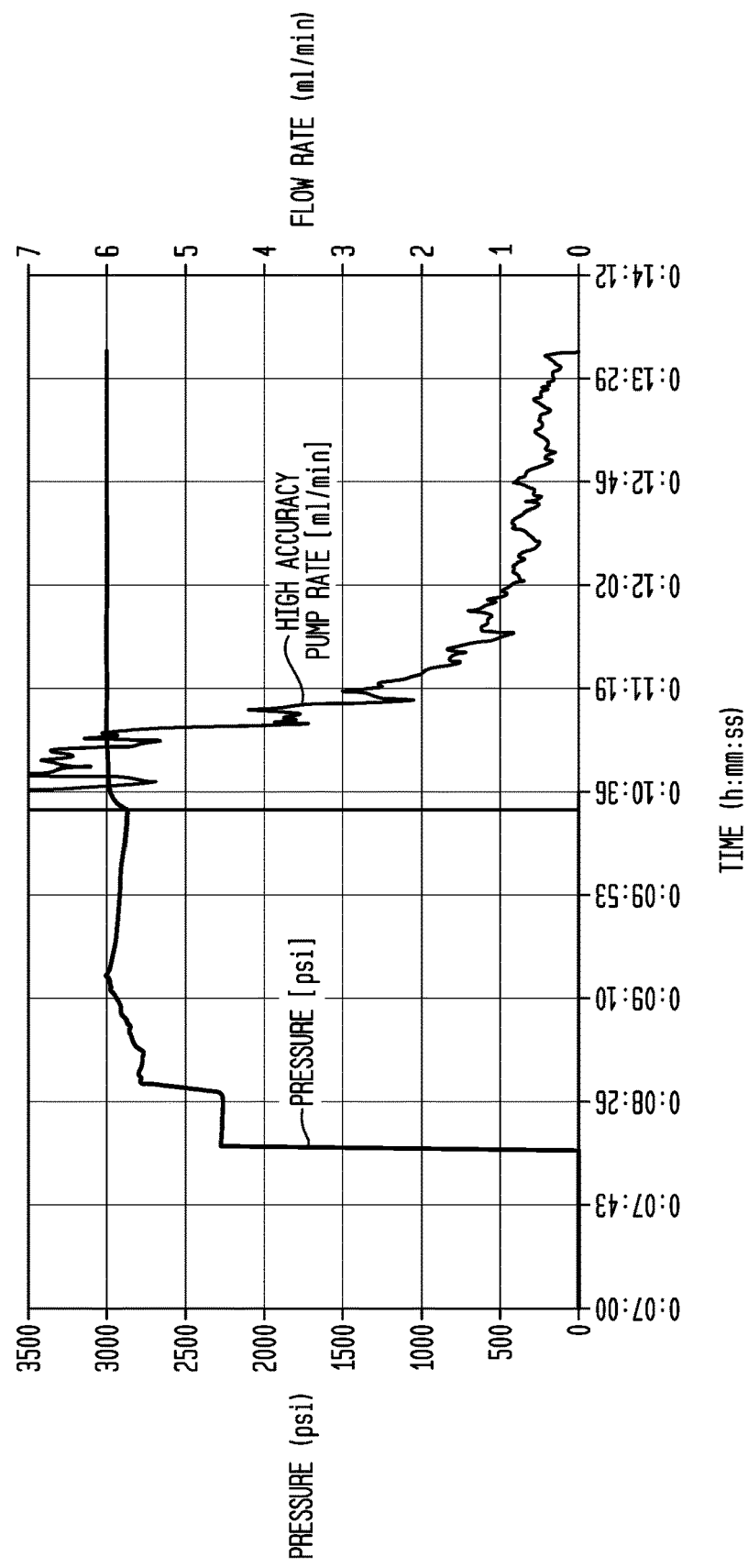
FIG. 4 is a graph showing the pressure vs. time response of a solid plug formed from solidified freeze media.

In use as a temporary sealing plug in a well, where the wellhead seals, or substantially seals, the upper end of the casing of the well, the pressure on the opposed sides of the solidified freeze medium will be the same, or nearly so. Once the wellhead is removed, the pressure above the freeze plug formed using the freeze medium will be essentially atmospheric pressure whereas the top of the casing will be exposed to ambient air. To mimic these conditions, after the freeze medium is solidified into the temporary sealing plug, pressure was applied to the region of the casing below the resulting temporary sealing plug using a high capacity piston pump until the pressure below the "freeze" plug was approximately 2900 psi and the pressure above the temporary sealing plug was atmospheric, on the order of 14.7 p.s.i. Additional diesel fuel was then injected into the region below the solidified temporary sealing plug using a high accuracy syringe pump capable of monitoring precise pressure and pump rates until the pressure below the temporary sealing plug was 3000 psi. FIG. 4 illustrates the results of the pressure test performed on the pressure tested temporary sealing plug. The test was deemed a success if the plug held 3000 psi of pressure with very little further diesel fuel injection (less than 0.5 ml/min) needed in the region below the temporary barrier plug to maintain the 3000 p.s.i. pressure level below the freeze plug The small flow rate that was experienced is most likely due to compressible air in the system or a small leak in the connections going into the model. No fluid movement or pressure increase was detected above the temporary barrier plug.

Field Trial

Using a freeze medium as described herein, a temporary barrier plug was successfully formed in a well having a low density hydrocarbon based fluid therein. Previous attempts to freeze the in situ well fluids to produce a barrier freeze plug failed. To form a temporary barrier plug using the freeze medium hereof in the well, twenty-one gallons of freeze medium were mixed in a small blender and pumped into 2⅞ tubing connected to the wellhead, thereby displacing the top of the hydrocarbon fluid therein about 50 ft. into the 2⅞ tubing. The well was cooled as described above, thereby solidifying the freeze medium into a competent freeze plug, allowing remedial operations to remove and replace the wellhead. After the remedial operation was completed, cooling was stopped and the solidified freeze medium was allowed to thaw. The resulting gelled water-microsphere mixture was then successfully discharged from the well using the pressure of the well fluid to push it out of the well and through the wellhead, allowing for normal operation of the well to continue thereafter. Table 5 shows the composition of the freeze medium used for this successful freeze plug formation. Again, as the hollow microsphere, a HGS3000 hollow glass spheres were used.

TABLE 5

Fluid composition for 6.3 lb/gal density freeze fluid

| Material | Concentration |
| --- | --- |
| Water/guar | — |
| HGS3000 | 1.95 lb/(gal of water) |
| Ecopol 2000LMS | 83.4 gal/(1000 gal of water) |
| Ecopol Buffer L | 0.75 gal/(1000 gal of water) |

Figure 5:
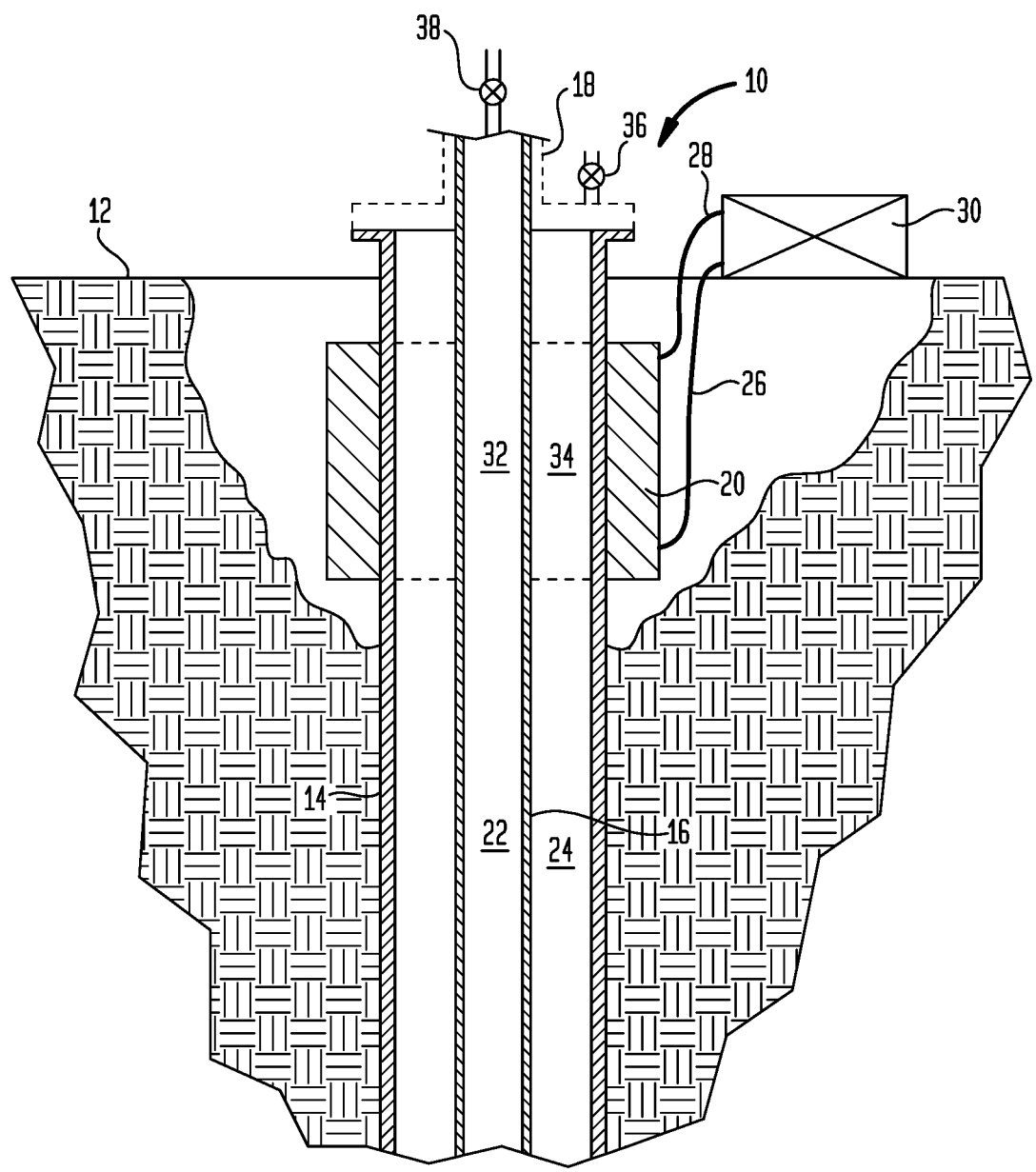
FIG. 5 is a schematic of the portion of a well adjacent to a wellhead.

Referring to FIG. 5, a schematic of a well 10 adjacent to the earth's surface 12 is shown, wherein a single casing 14 and production tubing 16 extending inwardly of the casing 14 and a wellhead 18 (shown in phantom) are surrounded by a cooling jacket 20. The production tubing 16 includes an interior volume 22 containing liquid hydrocarbons or a saline fluid therein, and an annulus 24 between the production tubing 16 and the casing 14 likewise may contain liquids such as liquid hydrocarbons or a saline fluid therein. The cooling jacket 20 is connected, via recirculation lines 26, 28, to a source of coolant, for example liquid nitrogen 30. The cooling jacket 20 surrounds an annulus upper region 34 and a production tubing upper region 32, which contain well fluids. The wellhead 18 includes valves 36, 38, for introduction of fluid into the annulus 24 and the production tubing interior volume 22. Herein, only one casing is shown for ease of understanding, it being understood that a plurality of casings, each independently fluidly accessible through valves in the wellhead, may be provided. Likewise, the production casing 16 is shown as present in the well, but it may be removed from the well through the wellhead 18 prior to forming the solid plug within the well immediately below the wellhead 18.

Figure 6:
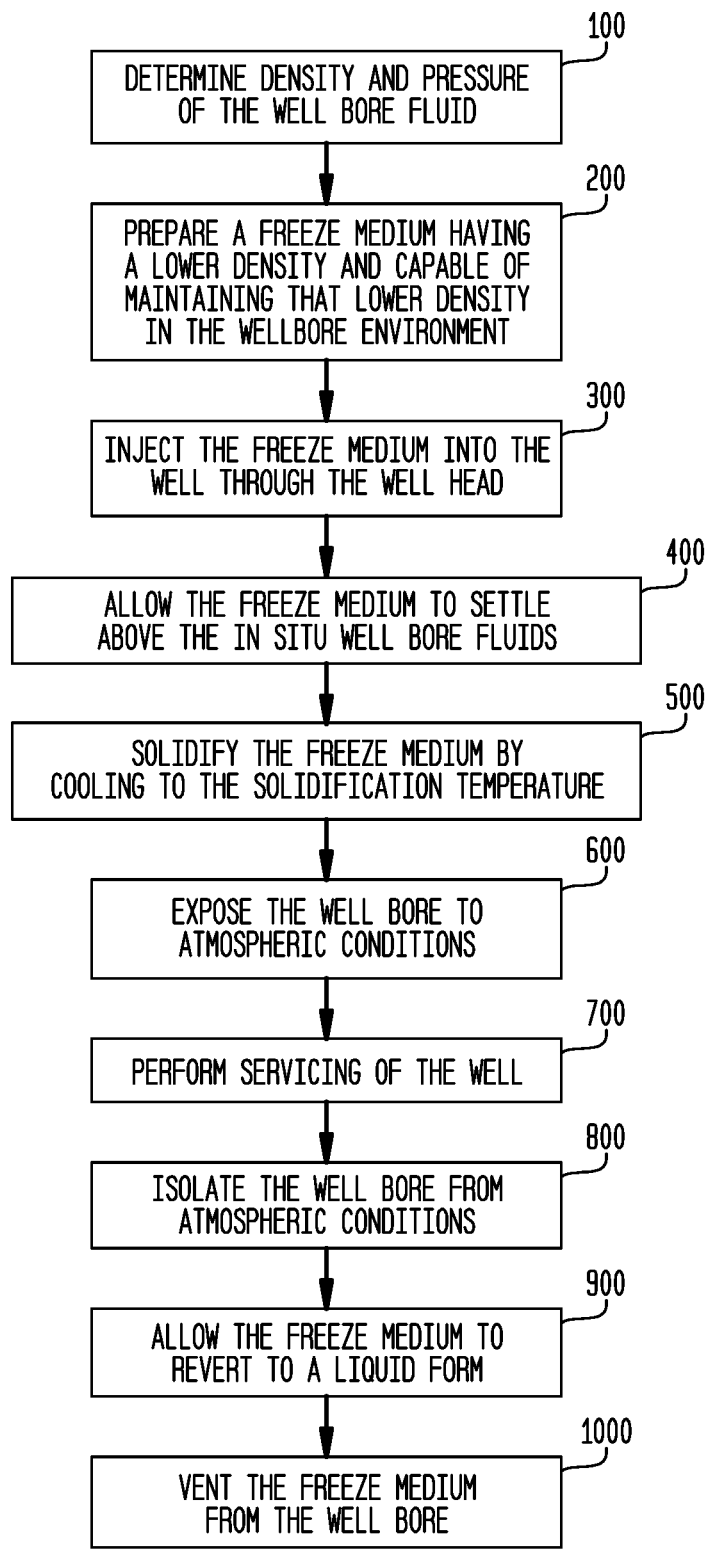
FIG. 6 is a flowchart setting forth steps in a sequence to perform wellhead replacement using the freeze media hereof.

Referring to FIG. 6 which is a flow chart setting out a sequence of events where a condition exists whereby one of the annulus 24 and interior volume 22 need to be exposed to atmospheric conditions. When this need arises, the density and pressure of the wellbore fluids are first determined at Act 100. The pressure can be determined by reading pressure gages between the valves 36, 38 and the annulus 24 and interior volume 22, and fluid samples of the wellbore fluid can be taken through those same valves to determine the specific gravity thereof. Where the production tubing 16 has been removed, a single volume is sampled within the circumference of casing 14. Then, at Act 200, and based upon the pressure and specific gravity of the wellbore fluid, an appropriate micro-sphere capable of withstanding the pressure in the wellbore, where less than 20% of the microspheres will fail under that pressure based upon the distribution of the physical properties thereof, is selected, and the appropriate quantity thereof relative to fresh water such that the resulting freeze media has a specific gravity at least 0.5 lbs./gal less than the wellbore fluid is determined, and the water, guar, microspheres, and other ingredients are intermixed to form the cross-linked freeze media containing sufficient microsphere content to ensure it is lighter, i.e., has a lower specific gravity, that the fluids present in the wellbore.

At Act 300, the freeze media is injected into the well through the wellhead, such as through one or more of the valves 36, 38, and allowed to settle above the well fluids in situ in the well 10, Act 400. Then, coolant is flowed through the cooling jacket 20 to cool, and thereby solidify, the freeze media in the well 10 into a solid plug, Act 500. With the solid plug in place, and while continuing to circulate the cooling media, the wellbore is exposed to the atmosphere at the earths' surface without risk of the pressurized well fluids escaping to the environment, the exposure achieved by venting the wellbore to the atmosphere through the wellhead or by removing the wellhead 18, and servicing of the well, such as by replacement of the wellhead, is performed, Act 700.

After the well servicing is completed, the wellbore is again isolated from atmospheric conditions around the well, Act 800, such as by replacement of the wellhead 18 on the well 10. Thereafter, the cooling jacket 20 is removed, and the freeze media is allowed to increase in temperature as a result of heat transfer thereto from adjacent well components, and where the trench around the well where the cooling jacket was located is filled, from the surrounding earth, Act 900. Thereafter, once in a liquid state, the freeze media is ejected from the well through the wellhead by the in situ pressure in the well. Act 1000. Although this sequence of events is described as based on a land based well, the same sequence applies to subsea wells, where the wellbore is exposed to the ambient seawater conditions, as exposed to atmospheric conditions, such as when the well head is removed from the well.

As set forth herein, a method of forming a freeze plug in a well employs a cohesive, low-density freeze medium to, in conjunction with a mechanism for heat transfer from the freeze medium, form a freeze plug in a well to create a temporary pressure and flow barrier therein. It is contemplated that the density of the freeze medium is between 5.3 lb/gal and 8 lb/gal, but may extend below 5.3 lbs./gal. The well environment pressure range where the freeze material can be used to effectively form a freeze plug is contemplated to range from 0 to 19,000 psi. The upper end of the pressure range is a function of the pressure at which a substantial percentage of the lightweight particulates used in the freeze medium lose physical integrity resulting in a change in the specific gravity of the freeze medium. For example, where microspheres are used to decrease the specific gravity of the freeze medium and thereby increase its buoyancy with respect to adjacent hydrocarbon liquids of saline water, the pressure at which a significant percentage of the microspheres collapse, rupture, or otherwise physically fail will provide a limit to the pressure the freeze medium can experience and still remain buoyant. Herein, to provide a safety factor or tolerance in the freeze fluid formulation for a given expected wellbore pressure, it is assumed that the hollow volume of the spheres which fail is replaced with the water-guar cross linked media.

While the foregoing is directed to embodiments of the present disclosure, other and further embodiments of the disclosure may be devised without departing from the basic scope thereof, and the scope thereof is determined by the claims that follow.

The invention claimed is:

1. A method of producing a temporary barrier in a well tubular, comprising:
    mixing together a liquid comprising water, a filler material and crosslinking agent, and a polymer gelling agent into a medium having a lower density than that of the fluid in the well tubular, wherein the filler material and crosslinking agent is at least one of borosilicate microspheres and microspheres having a boron coating thereon;
    introducing the medium into the well tubular and thereby displacing the fluid present in the well tubular, wherein the medium floats on the liquid in the well tubular;
    cooling the well tubular with a heat exchanger attached to the exterior of the well tubular and thereby solidifying the medium into a solid plug; and
    allowing the medium to desolidify, wherein the medium is flowed from the well tubular by an in situ pressure in the well tubular.

2. The method of claim 1, further comprising testing the differential pressure supported across the solid plug to confirm a functional barrier plug is formed.

3. The method of claim 1, further comprising performing remedial work on the well tubular.

4. The method of claim 1, wherein the polymer gelling agent is guar.

5. The method of claim 1, wherein the specific gravity of the medium is 5.3 lb/gal to 8.0 lb/gal.

6. A method of producing a temporary barrier in a well tubular containing a fluid comprising at least one of water, brine, a hydrocarbon, or a brine-hydrocarbon mixture therein, comprising:
    mixing together a liquid comprising water, a polymer gelling agent, a filler material having a lower specific gravity than the liquid and a crosslinking agent into a medium having a lower density than that of the fluid in the well tubular, and wherein the filler and crosslinking agent comprise at least one of borosilicate microspheres and microspheres having a boron coating thereon;
    introducing the medium into the well tubular through a wellhead and thereby displacing the fluid present in the well tubular, wherein the medium floats on the liquid in the well tubular and fills the well tubular immediately below the wellhead;
    cooling the well tubular with a heat exchanger attached to the exterior of the outermost casing of the well and thereby solidifying the medium into a solid plug;
    testing the differential pressure supported across the plug to confirm a functional barrier plug is formed;
    performing remedial work on the wellhead; and
    allowing the medium to desolidify, wherein the medium is flowed from the well tubular by an in situ pressure in the well tubular.

7. The method of claim 6, wherein the medium solidification temperature is greater than the solidification temperature of the fluid preexisting in the well.

8. The method of claim 6, wherein the specific gravity of the medium is 5.3 lb/gal to 8.0 lb/gal.

9. The method of claim 8, wherein the pressure within the wellbore is 0 to 19000 psi.

10. The method of claim 6, wherein the medium comprises 5 to 55 percent volume filler, by total medium volume.

11. The method of claim 6, wherein the polymer gelling agent is guar.

* * * * *